United States Patent [19]
Jentsch et al.

[11] Patent Number: 5,570,762
[45] Date of Patent: Nov. 5, 1996

[54] HYDRAULIC DAMPER

[75] Inventors: Erwin Jentsch, Riedstadt; Hartmut Wollstadter, Florsheim, both of Germany

[73] Assignee: Delphi Automotive Systems Russelsheim GmbH, Russelsheim, Germany

[21] Appl. No.: 535,699

[22] Filed: Sep. 28, 1995

[30] Foreign Application Priority Data

Oct. 27, 1994 [GB] United Kingdom ............... 94216694

[51] Int. Cl.$^6$ ........................................... F16F 9/34
[52] U.S. Cl. ............... 188/322.15; 188/282; 188/322.13
[58] Field of Search ..................... 188/282, 297, 188/311, 313, 317, 318, 322.13, 322.15, 322.22; 267/64.15, 64.26, 217

[56] References Cited

U.S. PATENT DOCUMENTS

| | | | |
|---|---|---|---|
| 1,984,144 | 12/1934 | Laugaudin | 267/64.15 |
| 2,348,160 | 5/1944 | Thornhill | 188/317 |
| 2,717,058 | 9/1955 | Brundrett | 188/322.15 |
| 2,788,092 | 4/1957 | Whisler, Jr. | 188/322.15 |
| 4,325,468 | 4/1982 | Siorek | 188/322.14 |
| 4,381,857 | 5/1983 | Cook | 267/64.26 |
| 4,460,073 | 7/1984 | Smeltzer | 188/322.13 |

Primary Examiner—Robert J. Oberleitner
Assistant Examiner—Chris Schwartz
Attorney, Agent, or Firm—Jeffrey A. Sedlar

[57] ABSTRACT

A hydraulic damper of the monotube type in which the floating piston includes a first valve allowing fluid flow from the compression chamber to the compensation chamber when fluid pressure in the compression chamber exceeds that in the compensation chamber by a predetermined amount, and a second valve allowing fluid flow from the compensation chamber to the compression chamber when fluid pressure in the compensation chamber exceeds that in the compression chamber by a predetermined amount. Provides improved high speed damping.

8 Claims, 2 Drawing Sheets

5,570,762

HYDRAULIC DAMPER

BACKGROUND OF THE INVENTION

The present invention relates to a hydraulic damper, such as a suspension strut or shock absorber, for the suspension system of a motor vehicle. In particular, the present invention relates to a hydraulic damper of the single or monotube type.

Known hydraulic dampers of the monotube type comprise a tube; a rod guide positioned at one end of the tube; a floating piston positioned inside the tube; a compensation chamber formed between the floating piston and the other end of the tube; a piston assembly sealably slidably mounted in the tube between the floating piston and the one end of the tube, the piston assembly separating a compression chamber from a rebound chamber within the tube; and a piston rod connected to the piston assembly and extending through the rebound chamber and the rod guide. The rebound chamber and the compression chamber are normally filled with hydraulic fluid. The compensation chamber is normally filled with gas. The piston assembly includes a rebound stroke valve and a compression stroke valve for controlling flow of fluid between the rebound chamber and the compression chamber.

In these known arrangements, if the hydraulic damper is subjected to a high speed compression stroke (such as when an associated wheel of a motor vehicle passes over a pot hole in the road) there is a risk that the compression stroke valve will not open quickly enough to allow adequate fluid flow from the compression chamber to the rebound chamber. In such cases, the damper does not work properly and the vehicle body may be damaged. Also, in such cases, a vacuum may be generated in the rebound chamber which can result in the seal between the piston rod and the rod guide opening to allow air into the rebound chamber. With this seal being open, the subsequent high speed rebound stroke may force fluid out of the rebound chamber pass the seal.

SUMMARY OF THE INVENTION

It is an aim of the present invention to provide a monotube hydraulic damper which can more adequately cope with high speed damping.

To this end, a hydraulic damper in accordance with the present invention comprises a tube; a rod guide closing one end of the tube; the other end of the tube being closed; a floating piston sealably slidably positioned within the tube to define a compensation chamber between the floating piston and the other end of the tube; a piston assembly slidably sealably positioned within the tube between the floating piston and the rod guide to define a rebound chamber between the piston assembly and the rod guide and a compression chamber between the piston assembly and the floating piston; and a piston rod connected to the piston assembly and extending through the rebound chamber and the rod guide; wherein the floating piston includes a first valve means allowing fluid flow from the compression chamber to the compensation chamber when fluid pressure in the compression chamber exceeds that in the compensation chamber by a predetermined amount, and a second valve means allowing fluid flow from the compensation chamber to the compression chamber when fluid pressure in the compensation chamber exceeds that in the compression chamber by a predetermined amount.

The present invention allows fluid to pass between the compression chamber and the compensation chamber during a high speed compression stroke thereby reducing the risk of developing a vacuum in the rebound chamber.

BRIEF DESCRIPTION OF THE DRAWINGS

The present invention will now be described, by way of example, with reference to the accompanying drawings, in which.

BRIEF DESCRIPTION OF THE PRESENTLY PREFERRED EMBODIMENT

Figure 1:
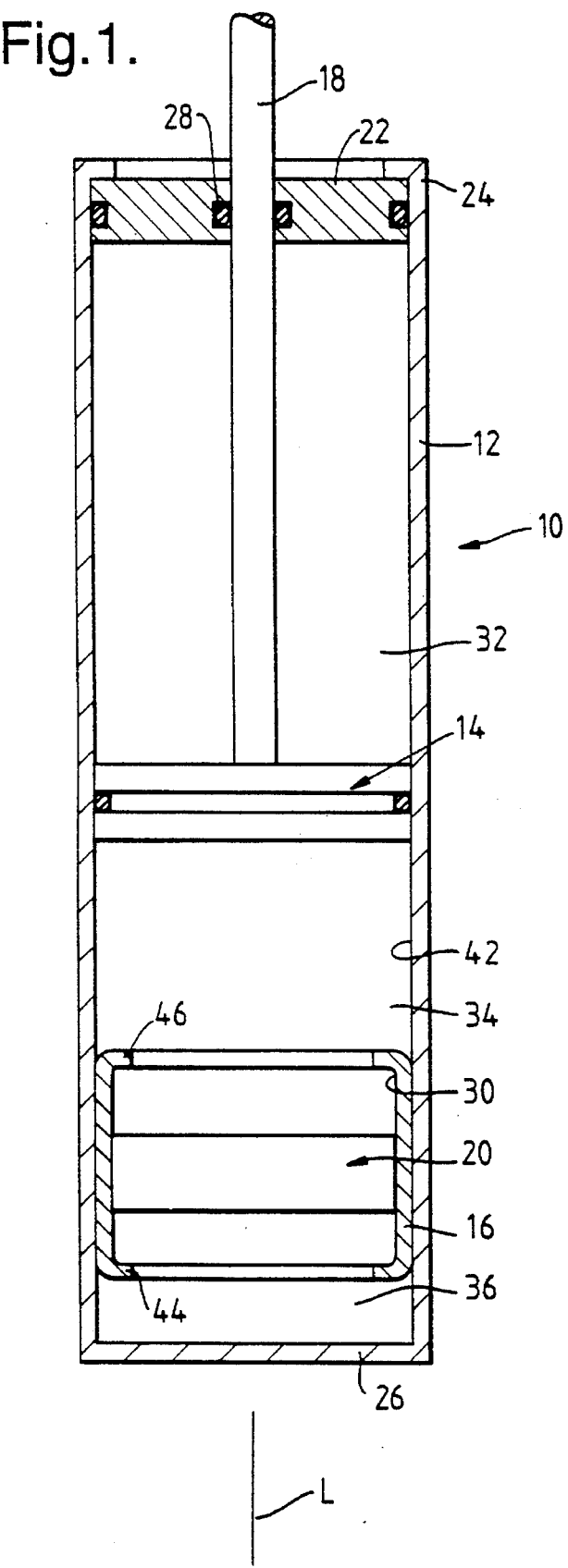
FIG. 1 is a cross-sectional view of a hydraulic damper in accordance with the present invention.

Referring to FIG. 1 of the drawings, the hydraulic damper 10 shown in FIG. 1 is of the monotube damper type, and comprises a tube 12 having a longitudinal axis L, a piston assembly 14, a piston rod 18 having a longitudinal axis on axis L, a floating piston 20 (which is described in greater detail below), and a rod guide 22. The piston assembly 14 and the rod guide 22 may be any suitable conventional design well known to those skilled in the art, and will not be described in detail. The piston assembly 14 is sealably slidably mounted in the tube 12. The tube 12 is substantially closed at one end 24 by the rod guide 22 which is fixed in position, and at the other end 26 by an integral formation of the tube walls or any other suitable means. The piston rod 18 extends through, and makes a sealing sliding fit with the rod guide 22 by way of seal 28. The piston rod 18 is secured to the piston assembly 14 by any suitable means. The piston assembly 14 divides the inner area of the tube 12 into a rebound chamber 32 between the rod guide 22 and the piston assembly 14, and a compression chamber 34 between the floating piston 20 and the piston assembly 14. The area between the floating piston 20 and the other end 26 of the tube 12 defines a compensation chamber 36. The rebound and compression chambers 32 and 34 are substantially filled with fluid to damp reciprocating movement of the piston assembly 14 and piston rod 18 along axis L relative to the tube 12. The compensation chamber 36 is substantially filled with fluid and acts to damp movement of the floating piston 20 along axis L relative to the tube 12. The piston assembly 14 includes a rebound stroke valve (not shown) and a compression stroke valve (not shown), both of which may be any suitable conventional design well known to those skilled in the art, and will not be described in detail. The hydraulic damper 10 is mounted in a motor vehicle (not shown) in any suitable manner.

A tubular sleeve 16 (see FIG. 2) is welded or otherwise secured to the inner surface 42 of the tube 12. The floating piston 14 makes a sealing sliding fit with the inner surface 30 of the tubular sleeve 16. The end 44 of the tubular sleeve 16 directed towards the other end 26 of the tube 12 is bent inwardly to define a stop means for the floating piston 20 during a compression stroke of the piston assembly 14. The other end 46 of the tubular sleeve 16, which is directed towards the piston assembly 14, is preferably also bent inwardly to define a stop means for the floating piston 20 during a rebound stroke of the piston assembly 14. For the sake of clarity, a rebound stroke is when the piston assembly 14 moves towards the rod guide 22, and a compression stroke is when the piston assembly moves towards the other end 26 of the tube 12, as is well known to those skilled in the art.

Figure 2:
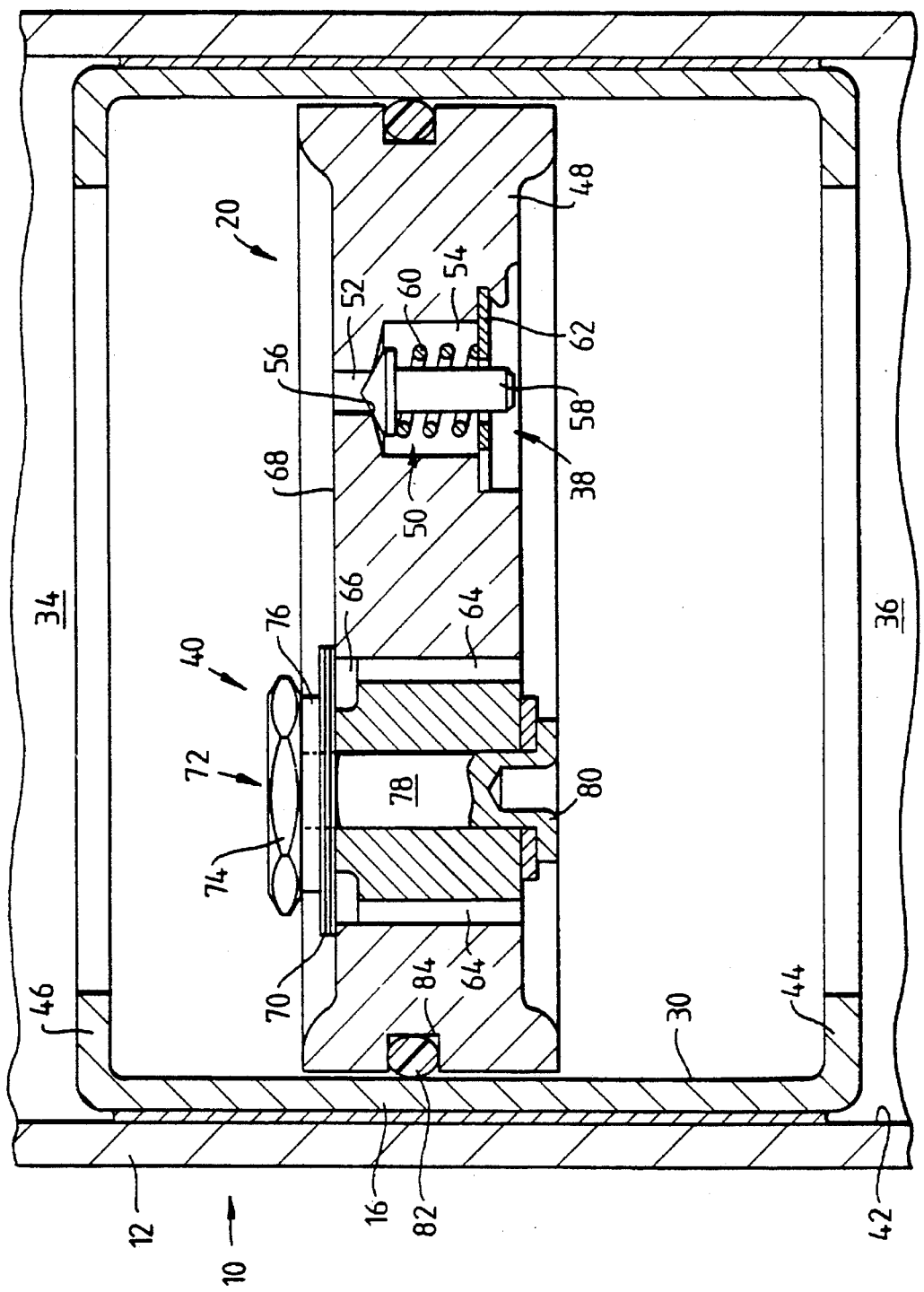
FIG. 2 is an enlarged cross-sectional view of the floating piston of the hydraulic damper of FIG. 1.

The floating piston 20, as shown in FIG. 2, comprises a piston body 48 with a first valve means 38 and a second valve means 40. An elastomeric O-ring seal 82 or similar is mounted in a circumferentially extending groove 84 in the piston body 48 and provides the required seal between the floating piston 20 and the inner surface 30 of the tubular sleeve 16. The first valve means 38 is associated with a through bore 50 formed through the piston body 48. The through bore 50 has a first diameter portion 52 which opens into the compression chamber 34 and a second diameter portion 54 which opens into the compensation chamber 36. The first diameter portion 52 has a smaller diameter than the second diameter portion 54 to form a step 56 therebetween which defines a valve seat. A valve member 58 is normally biased into engagement with the valve seat 56 by a coil spring 60 to close the through bore 50. The valve member 58 and spring 60 are retained in the second diameter portion 54 of the through bore 50 by a retaining washer 62 secured to the piston body 48.

During a compression stroke of the piston assembly 14, the piston assembly 14 moves towards the other end 26 of the tube 12 to compress the fluid in the compression chamber 34. At a predetermined fluid pressure differential where the pressure in the compression chamber 34 exceeds the pressure in the rebound chamber 32, the compression stroke valve (not shown) in the piston assembly 14 opens to allow fluid to flow from the compression chamber to the rebound chamber. Also, in the present invention, during a compression stroke, the increase in fluid pressure in the compression chamber 34 causes the floating valve 20 to move towards the other end 26 of the tube 12 until the piston body 48 engages the lower end 44 of the tubular sleeve 16. At a predetermined fluid pressure differential where the pressure in the compression chamber 34 exceeds the pressure in the compensation chamber 36 (before or after the piston body 48 engages the lower end 44), valve member 58 will move away from the valve seat 56 against the bias of the spring 60 to open the rebound stroke valve 38. This allows fluid to flow from the compression chamber 34 to the compensation chamber 36 by way of through bore 50.

The second valve means 40 is associated with one of more apertures 64 which pass through the piston body 48. The or each aperture 64 opens into an annular channel 66 formed in the side 68 of the piston body 48 directed towards the compression chamber 34. A number of resilient annular discs 70 normally cover the channel 66. The discs 70 are retained in positioned by a form of bolt 72 which has a head 74 engaging the discs by way of a spacer 76, and a shank 78 which extends through the piston 48. The free end 80 of the shank 78 is splayed over to secure the bolt 72 to the piston body 48.

During a rebound stroke of the piston assembly 14, the piston assembly 14 moves towards the one end 24 of the tube 12 to compress the fluid in the rebound chamber 32. At a predetermined fluid pressure differential where the pressure in the rebound chamber 32 exceeds the pressure in the compression chamber 34, the rebound stroke valve (not shown) on the piston assembly 14 opens to allow flow of fluid from the rebound chamber 32 to the compression chamber 34. Also, in the present invention, during a rebound stroke, the decrease in fluid pressure in the compression chamber 34 causes the floating valve 20 to move towards the one end 24 of the tube 12 until the piston body 48 engages the upper end 46 of the tubular sleeve 16. At a predetermined fluid pressure differential where the pressure in the compensation chamber 36 exceeds the pressure in the compression chamber 34 (before or after the piston body 48 engages the upper end 46), the outer circumferential edges of the discs 70 will move away from the side 68 of the piston body 48 to open the second valve means 40. This allows fluid to flow from the compensation chamber 36 to the compression chamber 34 by way of apertures 64 and channel 66.

The predetermined pressure differentials at which the first valve means 38 and the second valve means 40 open affect the damping characteristics of the hydraulic damper 10. These predetermined pressure differentials are determined by a number of factors including the resilient characteristics of the spring 60 and discs 70.

During a high speed compression stroke, for example, in excess of 5 m/s, and without the presence of the first and second valve means 38,40, the compression stroke valve (not shown) in the piston assembly 14 may not open quickly enough to cope with the sudden increase in the fluid pressure in the compression chamber 34. As a consequence, the hydraulic damper may not work properly. Also, a vacuum may be generated in the rebound chamber 32 which can cause the seal 28 to open. During the subsequent high speed rebound stroke, with the seal 28 open, hydraulic fluid can leak past the seal and out of the rebound chamber 32. In the present invention, the presence of the first and second valve means 38,40 moderates the excessive pressure build up the compression chamber 34 during a high speed compression stroke, thereby reducing the risk of the hydraulic damper failing to operate properly, and the risk of a vacuum being formed in the rebound chamber 32, with the subsequent risk of fluid leakage. The present invention therefore provides a monotube hydraulic damper which will provide damping at higher compression speeds than previously known monotube hydraulic dampers.

Although the above described arrangement envisages the use of a tubular sleeve 16 to provide stop means 44, 46, it will be appreciated that other forms of stop means for limiting the movement of the floating piston 20 may be provided on the inner surface 42 of the tube 12, either solely for compression stroke or for both compression stroke and rebound stroke.

The use of a tubular sleeve 16 does, however, have an additional advantage. Without the presence of the tubular sleeve 16 it would be necessary to provide a large portion of the inner surface 42 of the tube 12 with a high quality finish for the sealing sliding movement of the floating piston 20. With a tubular sleeve 16 present, the inner surface 42 of the tube 12 adjacent the other end 26 can be left with a poor quality finish, and only the inner surface 30 of the tubular sleeve need be provided with a high quality finish.

It will be appreciated that other designs of first and second valve means may be used as an alternative to the above described arrangements.

What is claimed is:

1. A monotube hydraulic damper containing fluid comprising:

a single tube having a closed first end and a second end;

a rod guide closing the second end of the tube and carrying a seal;

a first piston sealably slidably positioned within the single tube and separating a rebound chamber from a compression chamber within the tube wherein the rebound chamber is defined within the single tube between the first piston and the rod guide adjacent the rod guide and the seal;

a second piston sealably slidably positioned within the single tube and separating a compensation chamber from the compression chamber within the single tube wherein the compression chamber is defined within the single tube between the second piston and the first piston and the compensation chamber is defined within the single tube between the second piston and the closed first end of the single tube;

a rod connected to the first piston and extending through the rebound chamber and the rod guide and bearing against the seal;

wherein the second piston includes at least one valve controlling fluid flow between the compression chamber and the compensation chamber wherein the at least one valve allows fluid flow from the compression chamber to the compensation chamber when fluid pressure in the compression chamber exceeds fluid pressure in the compensation chamber by a predetermined amount and as a result during a high speed compression stroke of the first piston vacuum development in the rebound chamber is reduced thereby maintaining integrity of the adjacent seal of the rod guide.

2. A hydraulic damper as claimed in claim 1 further comprising a tubular sleeve secured in the tube wherein the second piston is positioned within the tubular sleeve.

3. A monotube hydraulic damper comprising:

a single tube;

a rod guide carrying a seal closing one end of the single tube; the other end of the tube being closed;

a floating piston sealably slidably positioned within the single tube defining a compensation chamber between the floating piston and the other end of the single tube;

a piston assembly slidably sealably positioned within the single tube between the floating piston and the rod guide defining a rebound chamber between the piston assembly and the rod guide and a compression chamber between the piston assembly and the floating piston; and a piston rod connected to the piston assembly and extending through the rebound chamber and the rod guide;

wherein the floating piston includes a first valve allowing fluid flow from the compression chamber to the compensation chamber when fluid pressure in the compression chamber exceeds that in the compensation chamber by a predetermined amount and as a result during a high speed compression stroke of the piston assembly vacuum development in the rebound chamber is reduced thereby maintaining integrity of the adjacent seal of the rod guide, and a second valve allowing fluid flow from the compensation chamber to the compression chamber when fluid pressure in the compensation chamber exceeds that in the compression chamber by a predetermined amount during a high speed rebound stroke of the piston assembly.

4. A hydraulic damper as claimed in claim 3, further comprising a first stop to limit movement of the floating piston towards the other end of the tube.

5. A hydraulic damper as claimed in claim 4, further comprising a tubular sleeve mounted inside the tube, the floating piston being sealably slidably positioned inside the tubular sleeve, wherein one end of the tubular sleeve is bent inwardly to define the first stop.

6. A hydraulic damper as claimed in claim 4, wherein a second stop is provided to limit movement of the floating piston towards the one end of the tube.

7. A hydraulic damper as claimed in claim 6 further comprising a tubular sleeve mounted inside the tube, the floating piston being sealably slidably positioned inside the tubular sleeve, wherein one end of the tubular sleeve is bent inwardly to define the first stop, and the other end of the tubular sleeve is bent inwardly to define the second stop.

8. A monotube hydraulic damper comprising:

a single tube having an inner surface, having a first end closed by integral formation of the single tube and having a second end closed by a rod guide wherein the single tube defines a rebound chamber adjacent the rod guide, a compensation chamber adjacent the second end and a compression chamber between the rebound chamber and the compensation chamber;

a piston assembly sealingly bearing against the inner surface of the single tube and defining a slidably boundary between the rebound chamber and the compression chamber;

a sleeve secured to the inner surface of the single tube including a first inwardly bent end forming a first stop and a second inwardly bent end forming a second stop;

a floating piston sealing bearing against the sleeve defining a boundary between the compression chamber and the compensation chamber and being slidable between the first and the second stops;

a first valve included on the floating piston openable only during a high speed compression stroke of the piston assembly at a predetermined fluid pressure differential where fluid pressure in the compression chamber exceeds fluid pressure in the compensation chamber wherein the first valve is openable as the floating piston slides toward the first stop before the floating piston engages the first stop and the first valve is openable after the floating piston engages the first stop;

a second valve included on the floating piston openable during a high speed rebound stroke of the piston assembly at a predetermined fluid pressure differential wherein fluid pressure in the compensation chamber exceeds fluid pressure in the compression chamber and wherein the second valve is openable as the floating piston slides toward the second stop before the floating piston engages the second stop and the second valve is openable after the floating piston engages the second stop.

* * * * *